J. BRENNAN.
Thill-Coupling.
No. 64,626.
Patented May 14, 1867.
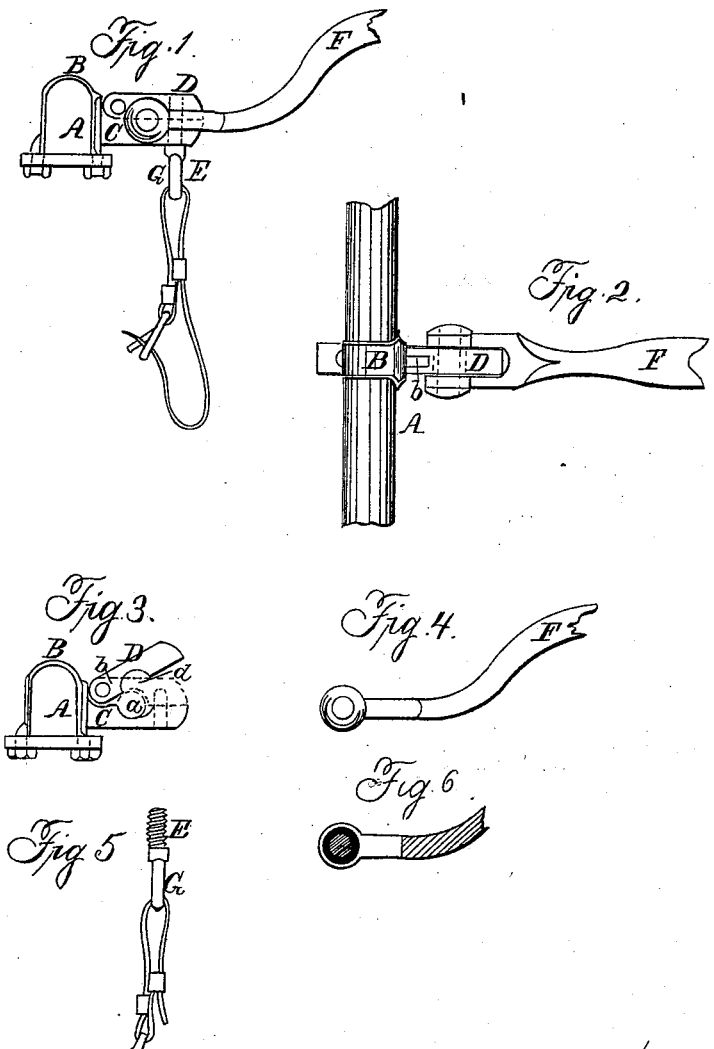

United States Patent Office.

JAMES BRENNAN, OF NEW HAVEN, CONNECTICUT.

Letters Patent No. 64,626, dated May 14, 1867.

---

IMPROVEMENT IN CARRIAGE-SHACKLE.

---

The Schedule referred to in these Letters Patent and making part of the same.

---

TO ALL WHOM IT MAY CONCERN:

Be it known that I, JAMES BRENNAN, of New Haven, in the county of New Haven, and State of Connecticut, have invented a new Improvement in Carriage-Shackle; and I do hereby declare the following, when taken in connection with the accompanying drawings and the letters of reference marked thereon, to be a full, clear, and exact description of the same, and which said drawings constitute part of this specification, and represent, in—

Figure 1, a side view.

Figure 2, a top view; and in

Figure 3, detached views.

This invention relates to an improvement in the manner of attaching the shafts or pole to a carriage-axle, and consists in the peculiar construction of the shackle, whereby the shafts or pole may be attached or detached with very little trouble.

To enable others to understand and to construct my invention, I will proceed to describe the same, as illustrated in the accompanying drawings.

A is the axle, to which, by an ordinary clip, B, the lower portion C of the shackle is attached. The said lower portion is formed with a semicircular recess, $a$, (see fig. 3,) and has attached to it by a hinged joint, $b$, a corresponding part, D, of the shackle, formed with a recess, $d$, corresponding to the recess $a$ in the lower part, so that when the two are closed, as denoted in red, the two recesses form a round hole through the shackle. The two parts are secured together by a screw, E, (see fig. 5,) passing through the lower portion, and screwed into the upper portion, as seen in fig. 1. F is the thill-iron, which is formed as seen in figs. 2, 4, and 5, so that when the shackle is open, as in fig. 3, the thill-iron may be set into the recess in the shackle, and the shackle closed over and secured thereon, as seen in fig. 1. It is advisable to form an eye, G, on the screw E, in which a strap is inserted, as seen in fig. 1, and attached to the thill or other part of the carriage, to prevent the possibility of the screw being accidentally turned. To remove the shafts or pole, take out the screw E, open the shackle as seen in fig. 3, and the shafts are easily removed. To prevent the rattling of the shafts in the shackle, I cover the bearing with India rubber sufficient to pack the joint.

Having thus fully described my invention, what I claim as new and useful, and desire to secure by Letters Patent, is—

The combination of the two parts C D, hinged together at the rear, and secured at the front by a screw, E, as and for the purpose specified.

JAMES BRENNAN.

Witnesses:
JOHN H. SHUMWAY,
JOHN E. EARLE.